United States Patent
Andre

(10) Patent No.: US 9,460,378 B2
(45) Date of Patent: Oct. 4, 2016

(54) ULTRA SLIM CARD INCORPORATING A USB DEVICE

(71) Applicant: Intermed Asia Limited, Hung Hom (HK)

(72) Inventor: Olivier Andre, Hong Kong (CN)

(73) Assignee: Intermed Asia Limited, Hong Kong (HK)

( * ) Notice: Subject to any disclaimer, the term of this patent is extended or adjusted under 35 U.S.C. 154(b) by 0 days.

(21) Appl. No.: 14/226,927

(22) Filed: Mar. 27, 2014

(65) Prior Publication Data

US 2015/0278672 A1 Oct. 1, 2015

(51) Int. Cl.
G06K 19/06 (2006.01)
G06K 19/077 (2006.01)

(52) U.S. Cl.
CPC ... G06K 19/07743 (2013.01); G06K 19/07722 (2013.01); G06K 19/07737 (2013.01); G06K 19/07739 (2013.01)

(58) Field of Classification Search
CPC .................... G06K 19/07775; G06Q 20/341
USPC ......................................... 235/492, 487, 488
See application file for complete search history.

(56) References Cited

U.S. PATENT DOCUMENTS

| | | | |
|---|---|---|---|
| 6,193,163 B1 | 2/2001 | Fehrman et al. | |
| 6,644,552 B1 | 11/2003 | Herslow | |
| 6,883,718 B1 | 4/2005 | Le et al. | |
| 8,127,996 B1* | 3/2012 | Williams et al. | 235/486 |
| 2002/0145049 A1 | 10/2002 | Lasch et al. | |
| 2003/0024995 A1 | 2/2003 | Conner et al. | |
| 2004/0234816 A1 | 11/2004 | Azakami et al. | |
| 2005/0247795 A1 | 11/2005 | Riedl et al. | |
| 2006/0011731 A1 | 1/2006 | Anders et al. | |
| 2007/0243769 A1 | 10/2007 | Atsmon et al. | |
| 2007/0252010 A1 | 11/2007 | Gonzalez et al. | |
| 2009/0267298 A1 | 10/2009 | Andre | |
| 2010/0142161 A1* | 6/2010 | Garnier | 361/749 |
| 2011/0182040 A1* | 7/2011 | Ellul et al. | 361/737 |
| 2011/0272308 A1 | 11/2011 | Andre | |

FOREIGN PATENT DOCUMENTS

CN  203502992 U  3/2014

OTHER PUBLICATIONS

Jul. 23, 2014 (EP) Search Report—App No. 14161887.6.

* cited by examiner

*Primary Examiner* — Daniel St Cyr
(74) *Attorney, Agent, or Firm* — Banner & Witcoff, Ltd.

(57) ABSTRACT

An ultra slim card comprising a card body formed of multiple PVC layers by lamination, a USB device storing data, and an attachment by which the USB device can slide in and out of the card body. The ultra slim card is advantageous comparing with the existing ABS USB card or the PVC card with USB function. The ultra slim card body can be made with less than 1.1 mm thickness at a high quality of surface printing. The ultra slim card can also incorporate with magnetic strip and/or smart chips and/or NFC chips; the card body can be embossed for personalization.

26 Claims, 6 Drawing Sheets

Embossing

Smart Chips

Magnetic Strip

Offset Printing

ULTRA SLIM CARD INCORPORATING A USB DEVICE

TECHNICAL FIELD

This patent application relates to the wallet-sized plastic card like a credit card or membership card that incorporates a USB (Universal Serial Bus) device and/or magnetic strip and/or a smart chip and/or NFC (Near field communication) device.

BACKGROUND

A USB card is already commercially available, and it consists of a card body which is a plastic body and a USD device connected with the card body. FIGS. 1A-1E depict several samples of the existing USB cards. A common feature of these USB cards is that the card body has a cut-out portion accommodating a USB device. The USB device can be securely attached to the card body or it ca be pivotally/slidably connected to the card body, depending on the aesthetic and design requirements. FIG. 1E also shows a USB card connecting to a USB port of a computer.

The prevailing manufacturing technology of the existing USB card is injection molding of ABS to form the card body. Patterns and labels are direct printed or adhered onto the plastic surface of the card body. Patterns and information cannot be printed on the ABS surface of the body by offset printing; labels bonded to the surface are subject to peeling up.

Due to an overall thickness of at least 2.5 mm, the ABS USB card cannot be embossed. Also magnetic strips or smart chips cannot be embedded into the body, due to the potential overall thickness makes the card non-operates with a regular card reader.

PVC card is also well known as it is normally used as credit cards or membership cards. A PVC card can be applied to more manufacturing technologies, such as embossing, offset printing. A PVC card may also embed a smart chip and/or magnetic strip and/or NFC chip. See FIG. 2. Even embedded with a smart chip, a magnetic strip and an NFC chip, a PVC card can still swipe across a card reader, see FIG. 3. A web key is recently-developed tiny electronic device that can be connected to any reader equipped with USB or mini USB port, such as computers, mobile phones, smart phones, tablets, etc. Once such a connection is established, an internet browser will be pop-up, and a predetermined web page will be shown in the display. As a web key contains no memory therein, it usually has a small size, compared with other storage devices, like USB memory devices. Detailed descriptions of a web key incorporated slim card can be found in the Hong Kong short-term patent Publication No. 1146194A.

SUMMARY

The invention provides ultra slim card comprising a card body formed of multiple PVC layers by lamination, a USB device storing data, and an attachment by which the USB device can slide in and out of the card body.

In a preferred embodiment, the card body is formed of three PVC layers, and the USB device is made by chip-on-board (COB) or surface mounted technology (SMT) and with a maximal thickness of 2.3 mm. The USB device may be implemented as a web key.

The USB device is form as a frame carrying an electronic chip, and the frame has a cavity which accommodates the electronic chip. Furthermore, at least one of the layers is provided with a cut-out portion thereon, a groove is provided along an edge of the cut-out portion so that the USB device can freely slide in the groove. One of the PVC layer has a hollow area fitting a NFC chip.

The groove is configured with a plurality of recesses along its length, and a projection extending laterally from a side of the USB device contacts with the groove, wherein the engaging of the projection with one recess defines a sliding position of the USB device.

Preferably, the groove is configured with one recess along its length, and the sides of the USB device which contact with the groove are configured with a plurality of projections, wherein the engaging of the recess with one projection defines a sliding position of the USB device.

In another embodiment, one layer having at least the same thickness of the USB device has a cut-out portion from an edge thereof, the USB device is slidable within the cut-out portion along the opposite sides thereof, wherein a stop formed as a projection from the side of the cut-out portion is provided at at least one side of the cut-out portion so as to define the most extent that the USB device can slide out.

The frame is less than 1.1 mm in thickness and the USB device has a maximal thickness of 2.3 mm. Once the USB device is assembled into the ultra slim card, it cannot be removed from the card body.

The frame is further configured to have a folding piece defined by a folding line with reduced thickness, the folding piece can be folded along the folding line and abut against the frame, and the cavity is disposed in the folding piece.

Alternatively, the ultra slim card further comprises a connecting member adhered to the frame, wherein the connecting member connected to a folding piece by a folding line, and the cavity is disposed in the folding piece.

In another preferred embodiment, the ultra slim card is a credit card or a membership card. A magnetic tape storing data is embedded into the card body or is adhered onto a surface of the card body, and/or a microchip storing data is embedded into the card body, and/or a chip that communicates with an external device wirelessly (e.g. an NFC chip) is built into the card body. The surface of the card body can be decorated by offset printing or embossing.

ILLUSTRATIONS OF DRAWINGS

DESCRIPTIONS OF EMBODIMENTS

Figure 1A:
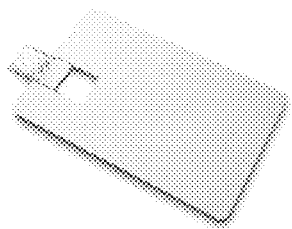
FIGS. 1A-1E show samples of the existing USB card, in particular a USB card connecting with a USB port of a personal computer.
Figure 1B:
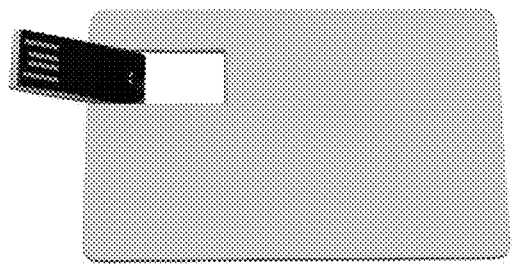
Figure 1C:
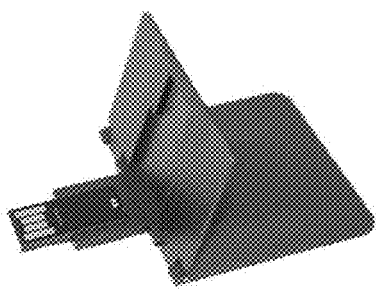
Figure 1D:
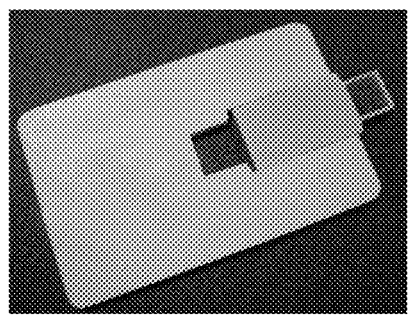
Figure 1E:
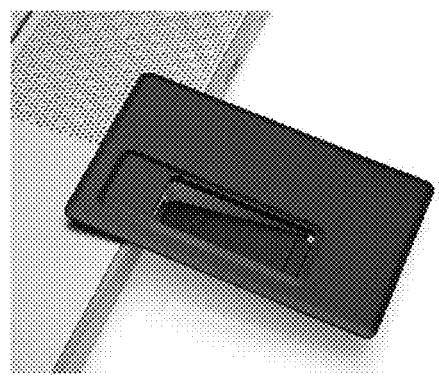
Figure 2:
FIG. 2 shows the existing PVC card, for instance a credit card or a membership card.
Figure 2:
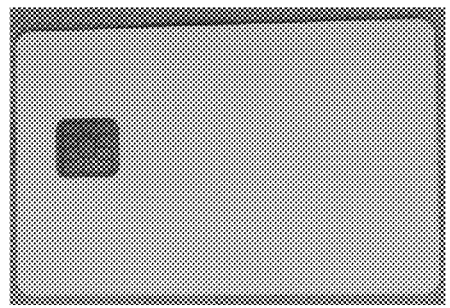
Figure 2:
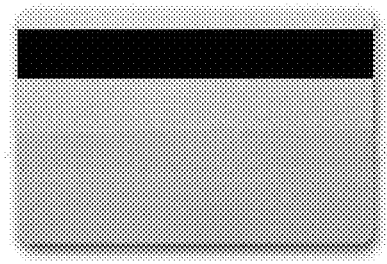
Figure 2:
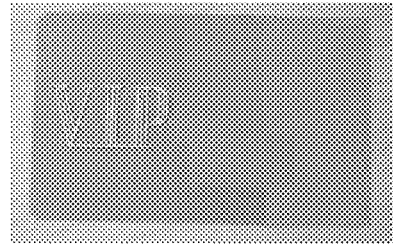
Figure 3:
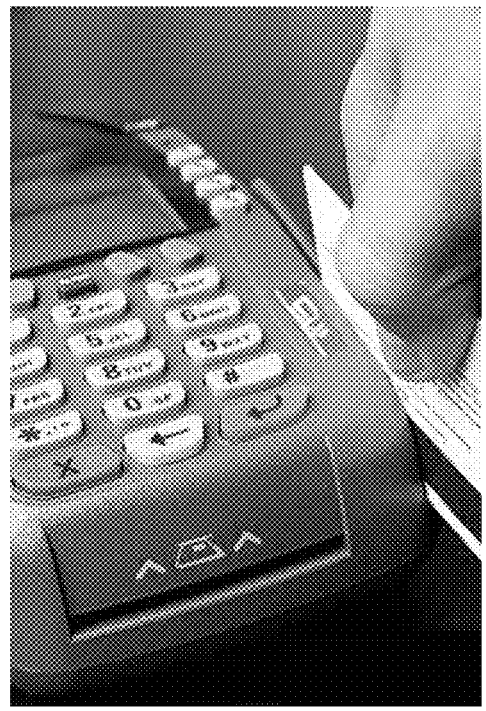
FIG. 3 shows the existing PVC card with a magnetic strip swiping across a reader.
Figure 4:
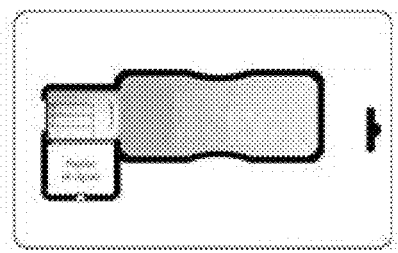
FIG. 4 shows a state-of-art PVC card with a USB storage device.

Referring to FIG. 4, the figure which demonstrates an existing PVC card with a USB storage, the card body is cut out to accommodate a smart chip. This card (commercialized by www.plug-up.com) is similar to a USB storage that can be directly connected to the internet using the USB port without a card reader or any hardware drive software. The USB storage may be embodied as a web key. The USB storage and its cover are attached to the card body by breakable joints along its edges. Users have to break the joints to get out the USB storage and insert the same into a USB port afterwards. The disadvantages are that once the USB storage is removed from the card body, it can not link to the body again.

Figure 5:
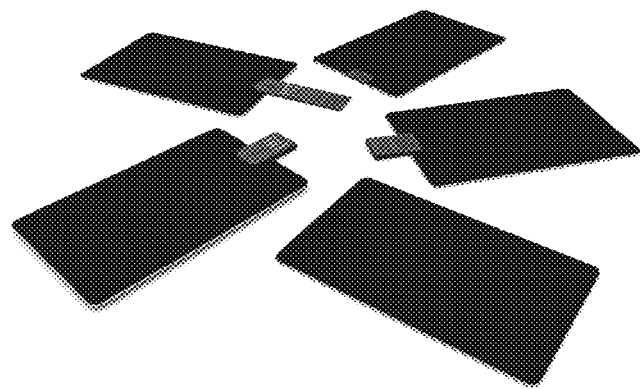
FIG. 5 shows an ultra slim card incorporating a web key in accordance with an embodiment of the invention.

FIG. 5 depicts samples of the ultra slim card of the present invention. The ultra slim card comprises a card body formed of multiple PVC layers by lamination, an attachment by which a USB device can slide in and out of the card body. FIG. 5 illustrates the USB device is completely received in the card body and is slid out of the card body.

Figure 6:
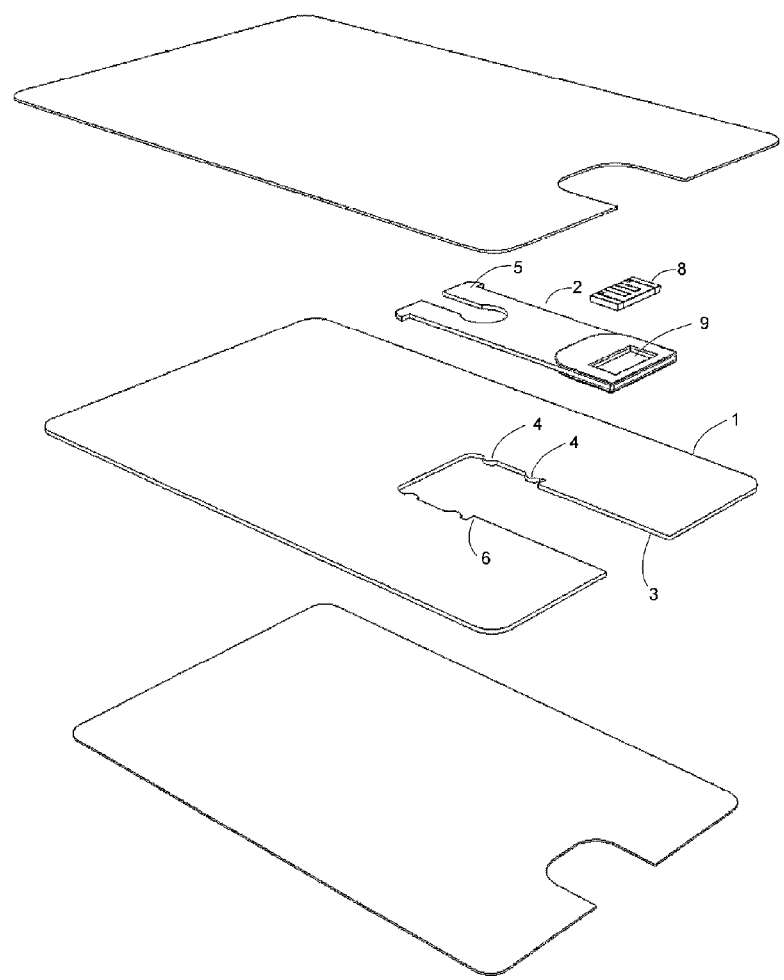
FIG. 6 is an exploded view showing a ultra slim card in accordance with an embodiment of the invention.

FIG. 6 shows more details of the ultra slim card incorporating a USB device. In this embodiment, a sandwich type card consisting of three layers are explained. Other numbers of layers are also within the scope of this invention. Each layer is made of PVC and forms the card body by lamination. A middle layer I accommodating a USB device 2 has a cut-out portion, and the cut-out portion is provided with a groove 3 along both of its edges, so that the USB device 2 can freely slide within the groove 3.

To restrict the extent of the sliding of the USB device 2, the groove 3 is configured with two recesses 4 along its length. The recesses 4 can engage with a projection 5 at an end of the USB device 2 which extends laterally from its side. The projection 5 contacts with the groove 3. Once the projection 5 engages with a recess 4, the USB device 2 can be secured in that position. Each recess 4 defines a sliding position of the USB device 2. Although the embodiment of FIG. 6 shows recesses 4 are fanned on both sides of the groove 3 and both sides of the USD device 2 have a projections 5, disposing the recesses and projection on one side only is also possible. If only one sliding position which defines the most extent that the USB device can slide out is preferred, the groove 3 can be configured with only one recess or one pair of recesses on both sides of the groove 3.

The USB device 2 is formed as a frame 7 carrying an electronic chip 8 in a cavity 9 thereof. The projection 5 extends laterally from the sides of the frame 7. Due to the larger thickness of the electronic chip 8 located at the connecting end of the USB device 2, the USB device 2 has a maximal thickness of 2.3 mm at the connecting end (the electronic chip 8), and the frame 7 overall is less than 1.1 mm in thickness.

The embodiment of FIG. 6 shows the middle layer I has a thickness not less than that of the frame 7. However, if a thicker frame is applied, more layers are required to form the cut-out portion so as to accommodate the USB device.

In an alternative embodiment, the middle layer 1 has a thickness at least the same as the frame 7. No groove is provided whilst the USB device 2 can still slide in the cut-out portion. However, a stop 6 is formed as a protrusion from one or both sides of the cut-out portion. Once the projection 5 of the USB device 2 contacts the stop 6, the USB device 2 cannot slide outward any further.

The USB device can be made by chip-on-board (COB) or surface mounted technology (SMT) and with a maximal thickness of 1.2 mm. A known method to prepare a USB data storage with such a small thickness is taught in US 201110292586 A1, the prior art which discloses a storage device of a package of COB.

Except the connecting end of the USB device 2, the ultra slim card is less than 1.1 mm in thickness. Such a slim dimension allows to be swiped across a POS machine. Contrary to that, the existing ABS USB card cannot swipe across a POS machine.

In a preferred embodiment which is similar to FIG. 6, one of the PVC layers making the card body has a hollow area 13 fitting a NFC (near field communication) chip 12. This permits the card to communicate with external reader wirelessly, as shown in FIG. 7.

Figure 7:
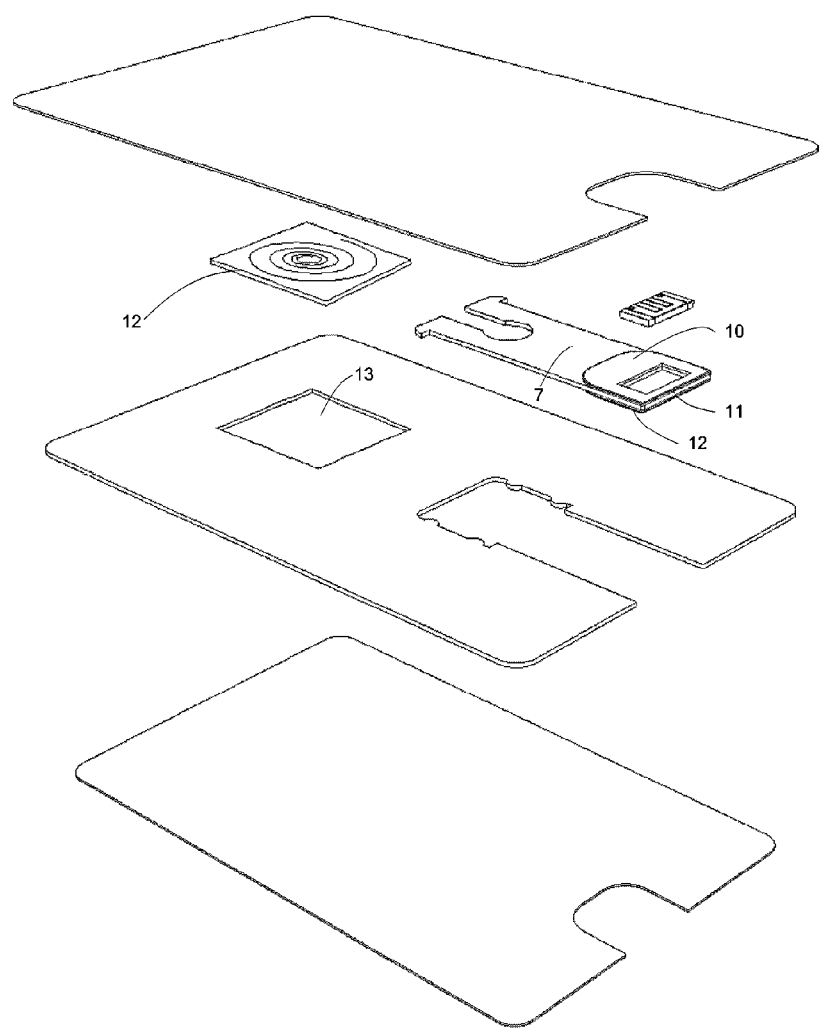
FIG. 7 shows another embodiment of the ultra slim card in accordance with the invention.

Still referring to FIG. 7, a folding function of the frame is described. Since the frame 7 is very slim with a thickness of less than 1.1 mm and some adapting ports of external devices are larger than that dimension, the connecting end of the frame 7 can be folded up by the hinge. The connecting end of the frame 7 may have a folding line 11 with a reduced thickness as so to act as a hinge, and a folding piece 10 may be folded along the folding line 11 and abut against the frame 7. In this embodiment, the electronic chip 10 is carried by a cavity in the folding piece 10.

In another embodiment, the frame 7 is configured as that in FIG. 6, but the folding piece 10. is connected to a connecting member 12 by the folding line 11. The connecting member 12 is attached to the frame 7 by adhesives.

Figure 8:
FIG. 8 shows an example of an ultra slim card of the invention configured as a credit card or a membership card.

As illustrated in FIG. 8, the ultra slim card is configured as a credit card or membership card. A magnetic tape is embedded into the card body or adhered onto the surface of the body. This card has an embedded microchip. Preferably, the card may have a chip therein to communicate with an external device wirelessly (e.g. an NFC chip). All of the magnetic tape, microchip and wireless chip can store data. Once the card is inserted into a reader, users can access to the data and change the same if necessary.

Still referring to FIG. 8, the card is embossed to present personal information, say cardholder's name and account numbers. ABS cards cannot be processed by embossing. Surfaces of the card body can be decorated with card issuing company's logo by offset printing.

As obvious from the above disclosure the ultra slim card is advantageous comparing with the existing ABS USB card and the PVC card with USB function. Specifically, the ultra slim card can be made with less that 1.1 mm thickness at a high quality of surface printing. The ultra slim card can also incorporate with magnetic strip and/or smart chips; the card body can be embossed for personalization.

The invention claimed is:

1. An ultra slim card comprising:
    a laminate of a plurality of PVC layers forming a card body defining an outer card body edge and a general card contour, wherein the laminate includes a top layer, a bottom layer and at least one intermediate layer;
    a cut-out portion in the at least one intermediate layer, the cut-out portion defining two parallel edges end extending up to the outer card body edge of the laminate; and
    a USB device including:
        a frame linearly slidably arranged in the cut-out portion between the top layer and the bottom layer and being moveable between a slid-in position and a slid-out position; and
        an electronic chip connected to the frame;
    wherein the electronic chip is positioned within the general card contour when the frame is in the slid-in position and is positioned outside of the general card contour when the frame is in the slid-out position.

2. The ultra slim card in accordance with claim 1, wherein the electronic chip of the USB device is mounted on a printed circuit board by chip-on-board technology.

3. The ultra slim card in accordance with claim 1, wherein the electronic chip of the USB device is mounted on a printed circuit board by surface mounted technology.

4. The ultra slim card in accordance with claim 1, wherein the frame has a cavity in which the electronic chip is accommodated.

5. The ultra slim card in accordance with claim 1, wherein at least one of the two parallel edges includes a plurality of recesses along its length, and wherein a projection extending laterally from the frame contacts with the at least one of the two parallel edges, wherein engaging of the projection with one recess of the plurality of recesses defines a sliding position of the USB device within the card body.

6. The ultra slim card in accordance with claim 1, wherein at least one of the two parallel edges includes one recess along its length, and wherein an associated longitudinal edge of the frame that is in contact with the at least one of the two parallel edges includes a plurality of projections, wherein the engaging of the recess with one of the plurality of projections defines a sliding position of the USB device within the card body.

7. The ultra slim card in accordance with claim 1, including a stop formed by a protrusion on at least one of said parallel edges of the cut-out portion to limit sliding movement of the frame relative to the card body.

8. The ultra slim card in accordance with claim 1, wherein the frame is less than 1.1 mm in thickness and the USB device has a maximal thickness of 2.3 mm.

9. The ultra slim card in accordance with claim 1, wherein the USB device is implemented as a web key.

10. The ultra slim card in accordance with claim 1, wherein the at least one intermediate PVC layer has a hollow area in which a NFC chip is accommodated.

11. The ultra slim card in accordance with claim 1, wherein the frame includes a folding line with reduced thickness, the folding line dividing the frame into a distal frame part and a proximal frame part,
   wherein a frame cavity accommodating the electronic chip is positioned in the distal frame part, and
   wherein the distal frame part can be pivoted along the folding line relative to the proximal frame part.

12. The ultra slim card in accordance with claim 11, further comprising a connecting member adhered to the distal frame part, wherein the connecting member comprises a cavity in which the electronic chip is accommodated.

13. The ultra slim card in accordance with claim 1, wherein the ultra slim card is a credit card or a membership card.

14. The ultra slim card in accordance with claim 1, wherein a magnetic tape storing data is embedded into the card body.

15. The ultra slim card in accordance with claim 1, wherein the USB device can be inserted into a reader to access to and change stored data.

16. The ultra slim card in accordance with claim 1, wherein a surface of the card body is decorated by offset printing or embossing.

17. The ultra slim card in accordance with claim 1, wherein the USB device is a web key.

18. The ultra slim card of claim 1, wherein the top layer and the bottom layer both comprise a cut-out portion defining a notch in the outer card body edge and extending within the general card contour,
   wherein the notch coincides with a part of the cut-out portion in the at least one intermediate layer,
   wherein a size of the notch is large enough to accommodate the electronic chip when the frame is in the slid-in position, and
   wherein the electronic chip is positioned in the notch when the frame is in the slid-in position.

19. The ultra slim card in accordance with claim 1, wherein the USB device has a maximal thickness of 2.3 mm.

20. The ultra slim card in accordance with claim 1, wherein the USB device has a maximal thickness of 1.2 mm.

21. The ultra slim card in accordance with claim 1, wherein the frame has a thickness of less than 1.1 mm.

22. The ultra slim card in accordance with claim 1, wherein a thickness of the ultra slim card, except for the electronic chip, is less than 1.1 mm.

23. The ultra slim card in accordance with claim 1, wherein a magnetic tape storing data is adhered onto a surface of the card body.

24. The ultra slim card in accordance with claim 1, wherein a microchip storing data is embedded into the card body.

25. The ultra slim card in accordance with claim 1, wherein a NFC chip that communicates with an external device wirelessly is embedded into the card body.

26. The ultra slim card in accordance with claim 1, wherein the plurality of PVC layers comprises three PVC layers.

* * * * *